Oct. 5, 1937.  F. L. AIME  2,095,090
HIGH VOLTAGE CABLE
Filed Nov. 11, 1936  3 Sheets—Sheet 2
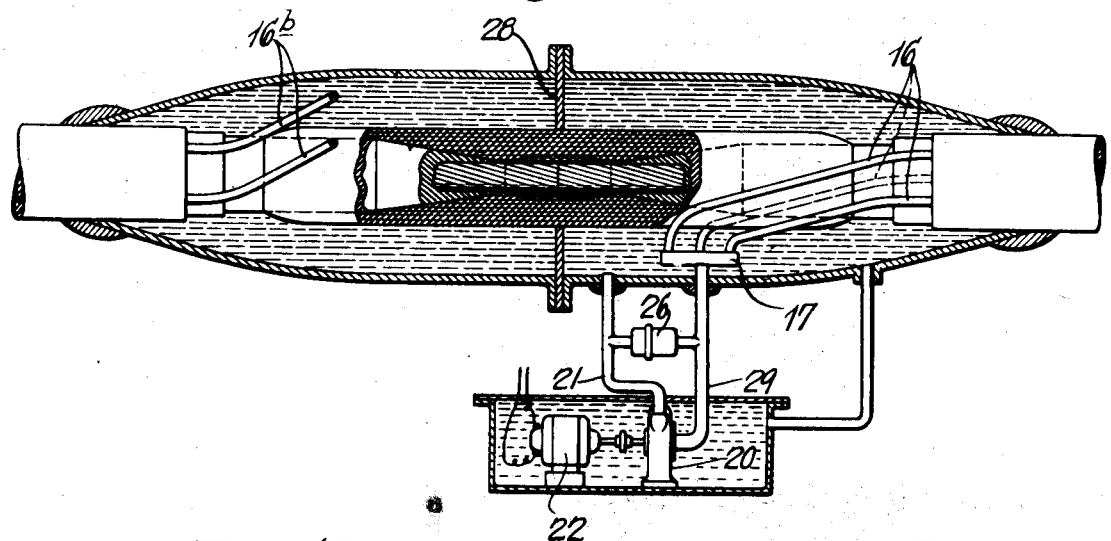
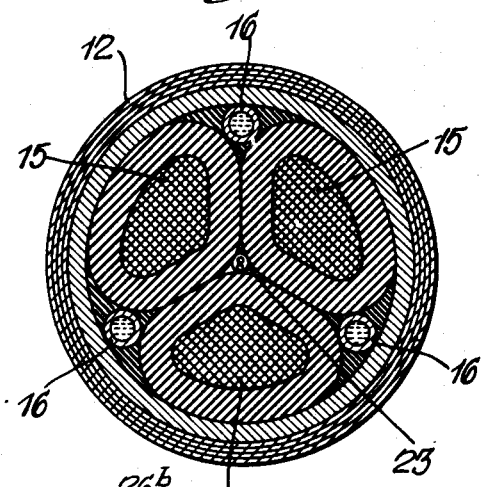
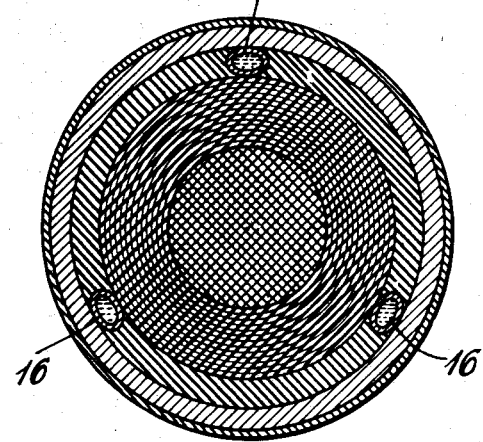
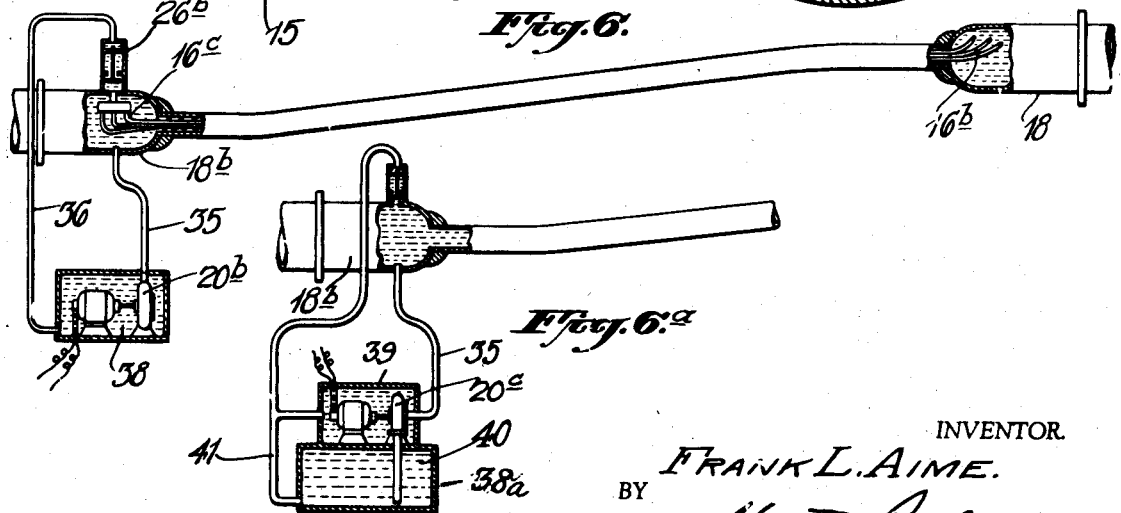
INVENTOR.
FRANK L. AIME.
BY
ATTORNEYS

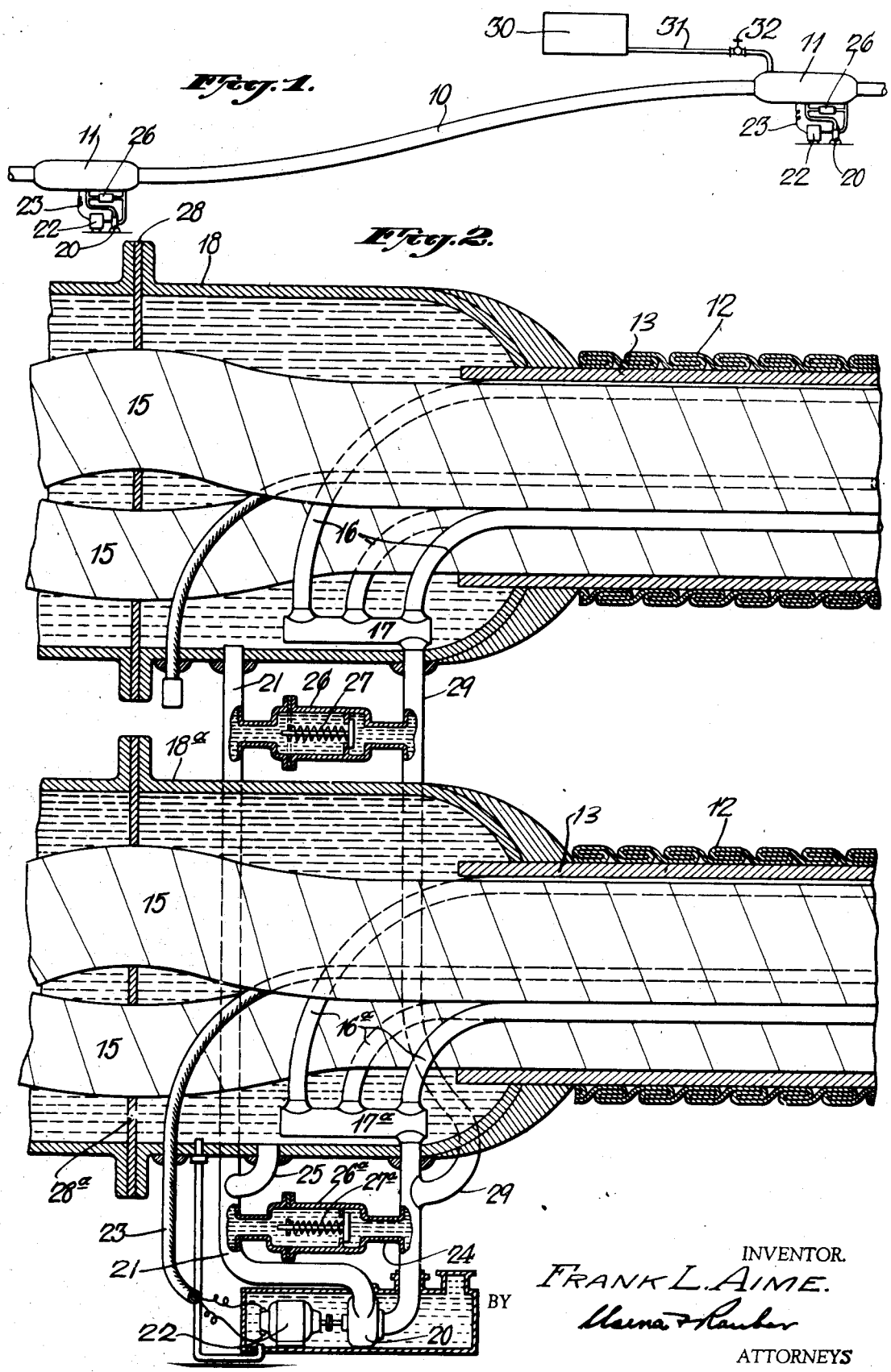

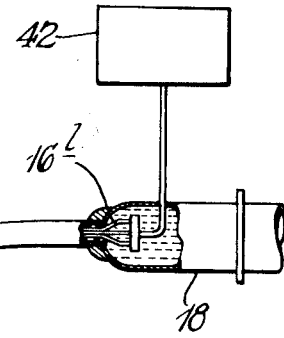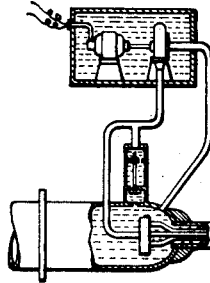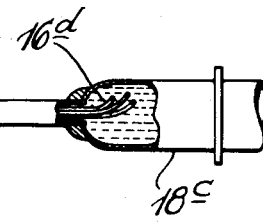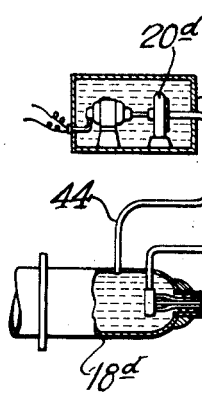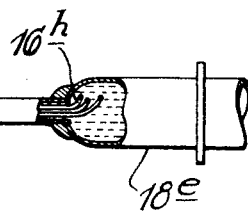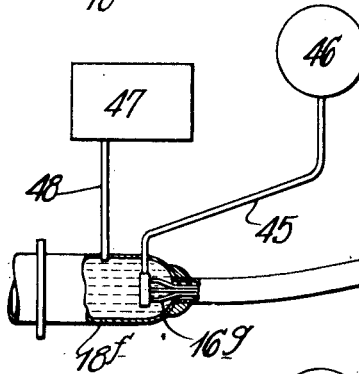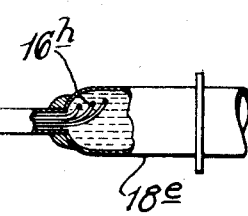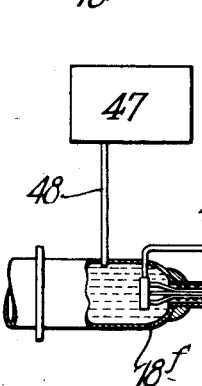

Patented Oct. 5, 1937

2,095,090

UNITED STATES PATENT OFFICE 2,095,090

HIGH VOLTAGE CABLE

Frank L. Aime, New York, N. Y., assignor to Anaconda Wire & Cable Company, New York, N. Y., a corporation of Delaware Application November 11, 1936, Serial No. 110,226

11 Claims. (Cl. 173—264)

This invention relates broadly to means for maintaining a substantially constant pressure on fluid insulation and means for maintaining substantially one hundred percent impregnation of the impregnated insulation in a high voltage cable enclosed in an impervious sheath, in which one or more conductors are each surrounded by a layer of absorbent insulation impregnated with a fluid dielectric. Heretofore, oil-filled cables and cables with oil impregnated insulation have usually required the use of external reservoirs, which allow for expansion and contraction of the liquid insulating medium due to alternate heating and cooling cycles of the cable. According to the present invention, the necessity of providing external reservoirs along the length of the transmission line is eliminated, although they may be used, if desired. This effects important economies in the first cost and also eliminates the cost of maintenance of such reservoirs and other accompanying accessories.

In one embodiment of the present invention, I provide containers for liquid insulation, which are coextensive in length with the cable, said containers being connected to a common header, which in turn communicates with and supplies oil to a pump driven by a constantly energized motor capable of so driving the pump that impregnation of the dielectric is maintained substantially complete. A substantially constant pressure is maintained on the liquid insulation, the pump motor stalling when a predetermined pressure is reached and starting up when the pressure falls below a predetermined point. A suitable relief valve is included between the suction and discharge sides of the pump, so that any tendency to build up an objectionably excessive pressure is overcome by the opening of the relief valve, thus establishing a connection between the inlet side and the outlet side of the pump.

For a more complete disclosure of the invention, reference is to be had to the accompanying drawings and following description and claims.

In the drawings—

Fig. 1 is a diagrammatic view of a section of a cable installation embodying the invention; Fig. 2 is an enlarged view showing a plurality of multi-conductor cables arranged for operation in accordance with the invention; Fig. 3 is a cross-section through a multi-conductor cable illustrating the oil containers incorporated therein; Fig. 4 is a view similar to Fig. 2 showing the invention applied to a single conductor cable; Fig. 5 is a cross-section of a portion of the single conductor cable shown in Fig. 4; Figs. 6 to 9 inclusive illustrate modifications.

Referring first to Figs. 1 to 3 inclusive, 10 represents a length of an underground transmission cable system, which is connected at widely spaced points by joints 11 commonly known as stop joints. The length of cable between the stop joints is enclosed in an outer armor 12, which may be in the form of spirally applied interlocking metal or fibrous tapes. Within the latter, there is an impervious sheath 13 of lead or the like. In some cases, there may be interposed between the sheath 13 and the armor 12, one or more wrappings of impregnated paper cushion, not shown. The sheath 13 encloses a plurality of cabled conductors 15, each of which is surrounded by a body of fibrous insulation, impregnated during the course of manufacture with liquid insulation of the type commonly employed in the art.

Extending coextensively with the cables 14, I provide a plurality of impervious tubes 16. In the embodiment of the invention shown in Figs. 1 to 3, there are three conductor cables and there are three tubes 16 located in the outer void space between each layer of conductor insulation 15 and the sheath 13.

The three container tubes 16 are connected to a header 17 located within the shell 18 of one of the cable joints. The ends of the container tubes 16 remote therefrom are plugged or closed. The header 17 is connected by means of a pipe 29 with the suction side of a pump 20. The outlet side of this pump is connected by means of a pipe 21 with the interior of the shell 18. The pump 20 is driven by an electric motor 22, which is constantly energized by power supplied by cable 23. If desired, this supply cable for the pump may be laid up with the power transmission cables within the sheath 13. As shown in Fig. 3, this cable is located in the central void between the several power transmission conductors. But, it may also be located externally of the high voltage cable 10. The motor 22 for driving the pump is of a special type capable of operating at a variable speed. Such a variable speed motor is capable of operating the pump at a maximum speed during the highest oil demand of the cable during the cooling thereof and can slow down to zero at the time of minimum oil demand during the end of the cooling period, or during the heating of the cable. The motor and pump, as shown, can be seated in an oil-tight container filled with oil and the supply cable to the motor within protected in the usual manner from entrance of moisture to the cable or to the container.

A special type motor 22 is so constructed and arranged that although current for energizing it is connected therewith its drive shaft can remain stationary without injury to the motor. Thus, when such motor is connected with the pump for transferring the oil or liquid insulation from the containers 16 to the interior of the cable, when a predetermined pressure is built up by the pump within the cable, the motor will stall and the pump will stop operating. And, when the pressure within the cable again drops, the motor being constantly energized will start up to again build up the pressure in the cable to the predetermined point. In practice, it is desirable to have a substantially constant pressure on a liquid insulation up to 100 pounds per square inch. A suitable series motor for this service is obtainable from well known manufacturers of electrical equipment. But, such a motor has never before been used insofar as I am aware in connection with the pump for maintaining a pressure on liquid or fluid insulation.

My purpose in keeping a constant pressure is to maintain substantially complete impregnation of the insulation as long as the cable is in operation. While the motor for driving the pump is preferably of the constantly energized type, it is to be understood that an intermittently operating motor may be used. Obviously, the operation of the constantly energized pump motor herein referred to may be cut out of circuit when making alterations or repairs to the cable system of which it forms a part.

In Fig. 2, I have illustrated a single pump and motor for maintaining pressure on a liquid insulating material in two separately sheathed cables. For this reason, the pipe 29 is provided with a branch 24 leading to the header 17a, which is connected to the three container tubes 16a of the second cable.

Similarly, there is a branch 25 leading from the pipe 21 to the casing 18a formed in the joint of the second cable. Between the pipes 29 and 21, there is located a relief valve 26. This valve is normally held on its seat by a spring 27 so that it prevents communication between pipes 19 and 21. The spring is of such strength that the valve will be thus seated until such time as the pressure exerted either by expansion of the oil as the cable heats up, or by the pump exceeds a predetermined amount. Thus, when built up pressure becomes excessive, the liquid insulating material instead of being transferred under such excessive pressure into the cable sheath will be returned via pipe 29 to the container tubes 16, which have sufficient volume to cause a pressure drop. As this pipe 29 is connected also with the suction side of the pump as well as to the container tubes 16, it will be appreciated that there can be no damage done by reason of the pump exerting too great a pressure. I also provide a similar relief valve 26a normally held on the seat by a spring 27a, the latter valve being interposed between branch pipe 24 and pipe 25 leading to the interior casing 18a.

Located within the casings 18 and 18a, there are barriers 28 and 28a, respectively, which isolate the oil in the cable sheath sections on the opposite sides thereof.

In normal operation, when the pump draws oil from the pipes 16, a partial vacuum is created therein, thus providing a ready receptacle for the insulating oil, when the relief valve 26 opens.

In the modification shown in Figs. 4 and 5, I have shown two portions of a single conductor cable, the right hand portion being equipped with the identical type of pump and motor, as illustrated in Fig. 2 and also having the relief valve interposed between pipes connecting respectively with the suction and outlet pipes of the pump. The corresponding parts in the two figures are similarly identified and further detail description is unnecessary. The portion of the cable shown to the left side of the barrier 28 shows two of the container tubes 16 with their ends plugged or capped, as at 16b. The joint insulation may be of conventional form.

In originally installing a cable system built in accordance with my invention, the container tubes, the interior of the cable sheath and all piping are filled with oil. There is no connection between the oil inside of the container tubes and the space within the cable sheath, except through the pump or the relief valve.

Prior to placing the cable in service, a temporary relief valve is attached to a cable sheath, or a reservoir partially filled is connected to the cable sheath. As soon as current is applied to the cable, the oil or other liquid insulation expands and such oil or insulation is forced or discharged through the temporary relief valve.

The cable is now in condition for service and the temporary relief valve is either removed or rendered non-operative at the period of maximum oil expansion. In service, as soon as the cable cools the pump motor will start and thereby draw the oil out of the tubes and force it into the cable sheath and thus maintain a substantially complete impregnation and constant pressure in the interior of the cable sheath at all times. When the cable begins to heat up and expand the oil again, the oil will pass through the relief valve 27 into the container tubes 16. Thus, it is clear that thorough and complete impregnation of the insulation is maintained and the interior of the cable is maintained under substantially constant pressure. The tubes are entirely surrounded by oil under such pressure. If the sheath 13 should develop a leak, the insulating oil will flow out of the cable and thus serve as a telltale. If the container tubes 16 develop a leak, the oil would flow into them under influence of the pump pressure and do no harm, since such oil would be immediately replaced, there being a sufficient excess of oil contained in the casing 18 and the tubes 16 to meet ordinary emergency requirements. If desired, I also contemplate connecting an auxiliary reservoir by means of a suitable pipe with one of the joint casings 18 for the purpose of supplying additional oil to meet emergencies. Such an auxiliary reservoir, as indicated at 30 in Fig. 1, is connected by a pipe 31 to the joint casing, a suitable manually controlled valve 32 being interposed between the reservoir and the sheath, if desired.

Figs. 6 to 9 inclusive illustrate modifications. In the arrangement of Fig. 6, the parts are substantially the same as shown in Figs. 1 and 2 with the exception that the tubes 16b are open at the points remote from the pump 20b. In this arrangement, however, the stop joint 18b is connected by a pipe 35 with the discharge side of the pump and the tubes 16b are connected at 16c to a relief valve 26b, which also connects by pipe 36 to the casing 38 enclosing the pump 20b, this casing being filled with oil.

As an alternative arrangement for the pump equipment shown in Fig. 6, I may arrange the parts as illustrated in Fig. 6a. In this modification, the pump 20c is located in the casing 39 above the casing 38a, which is filled with oil. A pipe 40 leads from the pump to the interior of the casing 38a. The discharge side of the pump is indicated at 35a and there is a pipe connection 41 adapted to lead to the pipe 36 of Fig. 6.

A further modification is indicated in Fig. 7. This arrangement is substantially the same as that illustrated in Fig. 6 with the exception that the ends of the tubes 16c instead of opening into the stop joint 18a are led to an oil reservoir or tank 42.

In the modification of Fig. 8, the tubes 16d are open at the ends which enter the stop joint 18c. These tubes are connected at 16d with a long coiled portion 16f which communicates with a reservoir 43 containing gas under pressure or oil and gas under pressure. In this arrangement, the pump 20d will be enclosed in a casing 38b filled with oil and forming an oil reservoir and the discharge side of the pump will be connected by a pipe 44 with the joint casing 18d.

In the modification of Fig. 8, tubes 16e will be open at the ends 16h which terminate within the stop joint 18e. Adjacent the other stop joint 18f, the tubes will be connected by a pipe 45, leading to a reservoir 46 containing gas under pressure. An oil containing reservoir 47 is connected by a pipe 48 with a stop joint 18f. In this arrangement, no pump is employed. When the oil expands, due to heating up the cable, a certain volume of it is forced into the open ends 16h of the tubes. This exerts a compressing action on the gas in the reservoir 46. Upon subsequent cooling of the cable, the gas expands and again forces the oil into the cable sheath.

The modification shown in Fig. 9 is substantially the same as that shown and described in Fig. 8 with the exception that the pipe 45 has included a coiled portion 45a. The other corresponding parts are indicated by like reference characters.

The cable shown and described herein may be used for transmission of either alternating current or direct current and while the insulation employed will usually be impregnated with oil or similar liquid insulating material, the invention also contemplates the use of a gaseous impregnant. And the term "fluid" used in the claims is intended to embrace either such liquid or gaseous impregnants.

Various modifications may be made by those skilled in the art without departure from the invention as defined in the appended claims.

What I claim is:

1. A cable installation comprising a conductor enclosed in fluid impregnated insulation, an impervious sheath enclosing the insulated conductor, a container tube within the sheath for the fluid insulation, a pump for transferring fluid insulation from said tube to the interior of the sheath and maintaining a substantially constant pressure on the fluid insulation therein and a motor effective to operate said pump at speeds from zero to maximum.

2. A cable installation comprising a conductor enclosed in fluid impregnated insulation, an impervious sheath enclosing the insulated conductor, a container tube within the sheath for the fluid insulation, a pump for transferring fluid insulation from said tube to the interior of the sheath and maintaining a substantially constant pressure on the fluid insulation therein and a motor effective to operate said pump at speeds from zero to maximum, so as to maintain said substantially constant pressure and a relief valve effective to establish communication between the container tube and the interior of the sheath and also between the suction and delivery sides of the pump when a predetermined pressure is reached.

3. An oil impregnated cable installation comprising a conductor enclosed in an envelope of oil impregnated insulation, an impervious sheath enclosing the insulated conductor, an insulating-oil-containing tube within the sheath, a pump for transferring insulating oil from said tube to the interior of said sheath and maintaining a substantially constant oil pressure therein, an electrically energized motor effective to operate said pump at speeds from zero to maximum so as to maintain said substantially constant oil pressure, and a relief valve effective to establish communication between the container tube and the interior of the sheath when a predetermined oil pressure is reached.

4. An oil impregnated cable installation comprising a plurality of conductors each enclosed in an envelope of oil impregnated insulation, an impervious sheath enclosing the latter, a plurality of insulating-oil-containing-tubes coextensive with said conductors and nested between them and the sheath, said tubes being closed at one end and in communication with one another at the opposite end and a pump and connections for transferring insulating oil from the tubes to the interior of the sheath.

5. An oil impregnated cable installation comprising a plurality of conductors each enclosed in an envelope of oil impregnated insulation, an impervious sheath enclosing the latter, a plurality of insulating-oil-containing-tubes coextensive with said conductors and nested between them and the sheath, said tubes being closed at one end and connected with a common header at the opposite end, a pump and connections for transferring insulating oil from the header to the interior of the sheath.

6. An oil impregnated cable installation comprising a plurality of conductors each enclosed in an envelope of oil impregnated insulation, an impervious sheath enclosing the latter, a plurality of insulating-oil-containing-tubes coextensive with said conductors and nested between them and the sheath, said tubes being closed at one end and in communication with one another at the opposite end, a pump and connections for transferring insulating oil from the header to the interior of the sheath, a reinforcement encircling the sheath to enable it to withstand the pressure developed by said pump.

7. An oil impregnated cable installation comprising a plurality of conductors each enclosed in an envelope of oil impregnated insulation, an impervious sheath enclosing the latter, a plurality of insulating-oil-containing-tubes coextensive with said conductors and nested between them and the sheath, said tubes being closed at one end and connected with a common header at the opposite end, a pump and connections including a relief valve effective to establish communication between the header and the interior of the sheath when a predetermined pressure within the sheath is reached.

8. An oil impregnated cable installation comprising a plurality of conductors each enclosed in an envelope of oil impregnated insulation, an impervious sheath enclosing the latter, a plurality of insulating-oil-containing-tubes coextensive with said conductors and nested between them and the sheath, said tubes being closed at one end and communicating with one another at the opposite end, a pump and connections for transferring insulating oil from the header to the interior of the sheath, an auxiliary oil reservoir communicating with the interior of the sheath.

9. An oil impregnated cable installation comprising a plurality of conductors each enclosed in an envelope of oil impregnated insulation, an impervious sheath enclosing the latter, a plurality of insulating-oil-containing-tubes coextensive with said conductors and nested between them and the sheath, said tubes being closed at one end and communicating with one another at the opposite end, a pump and connections for transferring insulating oil from the header to the interior of the sheath, and a motor effective to operate said pump at speeds from zero to maximum so as to automatically maintain a substantially constant oil pressure within the sheath.

10. An oil filled cable installation comprising a section of cable enclosed by a sheath with a respective stop joint at each end of the section, each stop joint including a shell communicating with the sheath, a conductor within the sheath surrounded by a body of fibrous oil impregnated insulation, an oil containing tube substantially coextensive with the conductor and being closed at one end, and means for transferring oil from the tube to the interior of the shell of the stop joint remote from said closed end of the tube and for maintaining a substantially constant pressure on the oil within the joints and the sheath, said means including a pump whose suction side is connected with the tube at a point remote from its closed end, a pipe connecting the outlet side of the pump with said shell and a relief valve and connections effective to establish communication between the interior of the shell and said tube when a predetermined pressure is reached.

11. An oil filled cable installation comprising a section of cable enclosed by a sheath with a respective stop joint at each end of the section, each stop joint including a shell communicating with the sheath, a conductor within the sheath surrounded by a body of fibrous oil impregnated insulation, an oil containing tube substantially coextensive with the conductor and being closed at one end, and means for transferring oil from the tube to the interior of the shell of the stop joint remote from said closed end of the tube and for maintaining a substantially constant pressure on the oil within the joints and the sheath, said means including a pump whose suction side is connected with the tube at a point remote from its closed end, a pipe connecting the outlet side of the pump with said shell and a relief valve and connections effective to establish communication between the interior of the shell and said tube when a predetermined pressure is reached and an electric motor effective to operate said pump when the oil pressure within the cable drops below a predetermined pressure and to stall when said pressure is attained.

FRANK L. AIME.